(12) United States Patent
Noordegraaf et al.

(10) Patent No.: US 7,998,570 B2
(45) Date of Patent: *Aug. 16, 2011

(54) METHOD FOR MANUFACTURING A FIRE RETARDANT COMPOSITE AND COMPOSITE THUS OBTAINED

(75) Inventors: Jan Noordegraaf, Wijchen (NL); Petrus Frederikus Maria Rensen, Doornenburg (NL); Christianus Marcus Gijsbertus Maria Buijk, Eindhoven (NL); Wilhelmus Petrus Theodorus Kemperman, Hapert (NL); Henricus Johanna De Swart, Dongen (NL); Abraham Araya, Wirral (GB); Eric Petrus Wilhelmus Elisabeth Smeets, Sittard (NL)

(73) Assignee: ERTECEE B.V., Oldenzaal (NL)

( * ) Notice: Subject to any disclaimer, the term of this patent is extended or adjusted under 35 U.S.C. 154(b) by 466 days.

This patent is subject to a terminal disclaimer.

(21) Appl. No.: 11/996,763

(22) PCT Filed: Jul. 24, 2006

(86) PCT No.: PCT/EP2006/007264
§ 371 (c)(1),
(2), (4) Date: Jun. 5, 2008

(87) PCT Pub. No.: WO2007/012441
PCT Pub. Date: Feb. 1, 2007

(65) Prior Publication Data
US 2008/0292867 A1    Nov. 27, 2008

(30) Foreign Application Priority Data

Jul. 26, 2005  (EP) ................................. 05254632
Jul. 26, 2005  (WO) ............... PCT/NL2005/000546

(51) Int. Cl.
*B32B 3/26* (2006.01)
(52) U.S. Cl. .................................................. 428/319.1
(58) Field of Classification Search ................ 428/319.1
See application file for complete search history.

(56) References Cited

U.S. PATENT DOCUMENTS

| | | | | |
|---|---|---|---|---|
| 5,342,595 | A * | 8/1994 | Davidovits et al. | 423/328.1 |
| 5,369,134 | A | 11/1994 | Grab et al. | 521/57 |
| 5,462,699 | A | 10/1995 | Montgomery et al. | 252/609 |
| 5,871,650 | A * | 2/1999 | Lai et al. | 210/653 |
| 6,197,415 | B1 | 3/2001 | Holman et al. | 428/314.4 |
| 2001/0006865 | A1 * | 7/2001 | Holman | 442/136 |
| 2009/0000518 | A1 * | 1/2009 | Araya et al. | 106/287.13 |
| 2010/0143725 | A1 * | 6/2010 | Araya et al. | 428/446 |

FOREIGN PATENT DOCUMENTS

JP         62 032130 A     2/1987

* cited by examiner

*Primary Examiner* — Hai Vo
(74) *Attorney, Agent, or Firm* — Roberts & Roberts, LLP

(57) ABSTRACT

The present invention relates to a method of manufacturing a fire retardant composite, a composite of a foamed polymer having a coating with fire retardant properties, and also the use of such composites. The method according to the present invention comprises the following steps: i) providing beads of foamed polymer, ii) applying a coating on the beads of step i) and iii) shaping the thus coated beads into said composite.

9 Claims, No Drawings

METHOD FOR MANUFACTURING A FIRE RETARDANT COMPOSITE AND COMPOSITE THUS OBTAINED

The present invention relates to a method of manufacturing a fire retardant composite, a composite of a foamed polymer having a coating with fire retardant properties, and also the use of such composites.

U.S. Pat. No. 5,462,699 relates to a fire retardant composition for application to, inter alia, building materials, the composition containing a silicate, water and surfactant.

Other routes for manufacturing a fire retardant coating to be applied on a foamed polymer are e.g.:
sodium silicate+esters (e.g. diacetin or triacetin),
sodium silicate+aluminum tripolyphosphate,
sodium silicate+calcium phosphate,
sodium silicate+aluminum sulphate.

The problem with using a silicate based fire retardant composition for building insulation materials such as expanded polystyrene (e.g. roofing insulation) is that, until needed, such materials are often left exposed to the adverse weather conditions after delivery to the building site, Unless precautions are taken to protect them against the wet, such exposure can result in significant loss of the mechanical and fire retardancy properties of the silicate-based composition.

Soluble silicates are widely used as adhesives, coatings and bondings. Whilst their inherent solubility is an asset in many of the applications for which they are used, it is disadvantageous for applications where, for example, water resistance, integrity and strength of structure are deemed essential.

Considerable efforts have been made to minimise the solubility of silicates in compositions of the kind referred to above, for example by addition of metal (such as calcium and magnesium) salts. However, addition of such salts tends to result in a precipitated form rather than a product with a continuous networklike structure. The soluble salt formed in the precipitation reaction is deleterious to the physical integrity of the applied film and hence ultimately, strength of the resultant product.

Factors such as these are a deterrent to the use of silicates in for example the production of fire retardant coating composition. Fire retardant coating compositions find wide application in the construction and building maintenance industries, for example for application to flammable building materials before, or after, their incorporation in a building structure. Examples of flammable materials are polymer tiling and sheeting, e.g. of expanded polystyrene or urethane plastics and composites containing such plastics. Wood, wood chip and paper based materials can also benefit from application of such coatings. Included within the class of fire retardant coating compositions are so-called intumescent coatings which exert their protectant action partly by swelling when exposed to heat or fire.

In some cases, flammable materials are sold with the fire retardant coating pre-applied. For example, an intumescent fire retardant coating known as SafeCoat E84™ is pre-applied to expanded polystyrene/polyurethane foam articles prior to sale.

We have now found that improved composites having an aqueous coating can be produced from silicates in such a way that the solubility problem discussed above is significantly counteracted thus making compositions according to the present invention suitable for use as fire retardant compositions.

A further advantage of the compositions of the present invention is that they may be used to prepare fire retardant systems that are, when required, substantially free of halogen-containing compounds. Halogen-containing compounds may become undesirable because of their potential environmental status.

Thus a first aspect of the present invention provides a method of manufacturing a fire retardant composite, the method comprising the following steps:
i) providing beads of foamed polymer,
ii) applying a coating on the beads of step i) and
iii) shaping the thus coated beads into said composite.

According to a preferred embodiment of the present method step iii) is carried out in a press. Typically step iii) is carried out as a casting method. In another embodiment step ii) is carried out in a fluid bed, wherein the coating is sprayed onto the beads and an air flow is blown through the bed of beads. It is further preferred to carry out step ii) in an agitated bed, wherein the coating is sprayed on the beads, or to carry out step ii) in a mixer, for example a ribbon blender, wherein the coating is sprayed on the beads. It is furthermore possible to replace step iii) by steps iv), v) and vi), in which step iv) transferring the coated beads to a press, v) applying steam to the coated beads present in said press, and vi) releasing the composite from the press.

The foamed polymer is selected from PUR, PET, EPP, EPE, expanded polyvinyl arylenes or a combination thereof. Its density lies preferably within the range of 5-500 kg/m$^3$, whereas the density of the foamed polymer plus the coating lies within the range of 10-1000 kg/m$^3$, on a dried coating basis.

Another aspect of the present invention provides a method of manufacturing a fire retardant composite in which a coating is used, i.e. an aqueous gel-forming composition comprising an aluminosilicate and, if appropriate, an organic liquid which enhances the integrity of films formed by application of the composition as a coating to a surface of a foamed polymer followed by drying.

In another aspect of the present invention, the aqueous gel-forming composition that is used in the present method comprises:
(a) from 5% to 40%, preferably 5% to 30%, of an aluminosilicate;
(b) from 0.1% to 10% of an organic liquid,
wherein the organic liquid has a boiling point of greater than 110° C.

Boiling points in this specification are to be measured at standard atmospheric pressure.

By aqueous it is meant that the balance of the composition comprises water and optionally one or more other ingredients. Typically, the compositions of the invention comprise at least 20% by weight of water, preferably at least 30%, more preferably at least 40%.

As used herein, the term "gel" refers to a substance that contains a continuous solid skeleton (in the present case based on the aluminosilicate) enclosing a continuous liquid phase (in the present case, predominantly water)—see for example Sol-Gel Science, The Physics and Chemistry of Sol-Gel Processing (C. J. Brinker and G. W. Scheer) published by Academic Press Inc.

These materials may also be referred to as co-gels or coa-gels. Initially, the solid may be in the form of dispersed, discontinuous solid particles (a sol), but these individual particles coalesce to form a continuous solid network. The compositions of the invention are initially in the form of a sol which converts over time to a gel.

In the absence of said organic liquid, we have found that the more extensive the drying, the more prone a film coating produced using the aluminosilicate composition is to result in a weak and powdery coating in a relatively short time. When the organic liquid is present however, the integrity of the coating in terms of its strength and non-powdery nature is considerably improved.

The organic liquid is preferably one which is substantially water-immiscible. Usually the degree of immiscibility is such that, at 25° C., the organic liquid dissolves to the extent of less than about 10% by weight (preferably less than about 5 wt %) in water, or water dissolves to the extent of less than about 10 wt % (preferably less than about 5% by weight) in the organic liquid.

The aluminosilicate as used in the present invention is typically formed by the sol-gel route and this can be effected in situ by forming the aluminosilicate at the point of use, by mixing precursor liquids. The present invention is limited to methods of manufacturing fire retardant composites, comprising beads of foamed polymer having a coating, the composites comprising beads of foamed polymer and their use as a construction material and an insulant. The present invention does not extend to compositions comprising aluminosilicate, methods of making such compositions and precursor systems therefor and application systems for those precursor systems. However, a precursor system for forming a coating composition for application on foamed polymers in a method according to the first aspect of the invention may comprise:

(i) water and a metal aluminate;
(ii) water and a metal silicate; and, if appropriate,
(iii) said organic liquid.

A sol-gel is basically a reaction product which is initially formed as a liquid but which subsequently forms a gel and ultimately solidifies.

At least part of the organic liquid may be incorporated in component (i) and/or component (ii). Alternatively, it may initially be entirely separate from both of components (i) and (ii).

An application system for forming a coating composition from a precursor system as described above and applying the coating composition so formed to a foamed polymer substrate may comprise means for admixture of components (i), (ii) and (iii) and application means for effecting coating of the substrate with the resulting mixture.

Another aspect of the present invention provides a composite of foamed polymer having a coating with fire retardant properties wherein the coating is produced using an aqueous gel-forming composition, comprising an aluminosilicate composition, and one or more optional other ingredients.

The aqueous gel forming composition preferably comprises a film-integrity enhancing organic liquid. Typically the aluminosilicate composition is from 45% to 90% by weight, on basis of the dried coating, in which the aluminosilicate composition is preferably from 50% to 85%, by weight, on basis of the dried coating. The moisture content of the dried coating is no greater than 40%, preferably no greater than 30% and more preferably no greater than 20% by weight, especially 16%, by weight. The coating further comprises at least one metal or metal oxide in an amount of up to 16%, preferably up to 8% by weight of the dried coating, in which the organic liquid comprises up to 16% by weight of the dried coating. Typically the aluminosilicate has a Si:Al mole ratio of from 3 to 30, typically up to 15, preferably up to 10.

The coating composition for application on the foamed polymer may comprise admixture of the following components:

(i) water and a metal aluminate;
(ii) water and a metal silicate; and, if appropriate,
(iii) said organic liquid.

A further aspect of the present invention provides the use of a composite according to the present invention as a construction material, especially in buildings, as well as an insulant, especially in buildings. The construction element is chosen from the group panel, door, sheeting, ceiling and tile. Another application of the present composite is as a construction material for packaging.

Coatings formed from compositions such as described above exhibit superior physical integrity and long term stability, in comparison with conventional silicate systems, by virtue of the aluminosilicate being present in the form of a network of bonded molecules that extends throughout the solution and by virtue of the presence of said organic liquid.

Typically the composition prior to application to a foamed polymer comprises at least 5% by weight of the aluminosilicate, and 0 to 10% by weight of said organic liquid.

A preferred class of compositions to be used as a coating on foamed polymers in a method according to the present invention consists of those which comprise:

(a) from 5% to 40%, preferably from 5% to 30% and more preferably from 10% to 25% by weight of the aluminosilicate;
(b) from 0% to 10%, preferably from 0.001% to 10%, more preferably from 0.1% to 10% and most preferably from 0.3% to 5% by weight of the organic liquid; and
(c) the balance being the water and one or more optional other ingredients.

One or more optional other ingredients may beneficially be incorporated in compositions according to any aspect of the present invention, e.g. in amounts from 0.001% to 5%, such as 0.01% to 2% by weight of the composition for any or each class, and may for example be selected from any of the classes:

(i) one or more surfactants, preferably selected from anionic, nonionic, cationic, amphoteric and zwitterionic surfactants and mixtures thereof, for example those which are known to be compatible with silicate and/or aluminate solutions, such as alkali caprybampho-proprionates;

(ii) one or more phosphonates and/or phosphonic acids, such as tri-phenylphosphates and nitrilotric (methylene) triphosphoric acid;

(iii) one or more slow proton releasing inorganic salts such as dihydrogen aluminium phosphates;

(iv) one or more sequestrants such as EDTA or of the phosphonate type, e.g. those sold under the name Dequest; and (v) one or more isocyanates such as methylene di-isocyanate.

The amount of water in such compositions is preferably from 60% to 95%, more preferably from 70% to 90% by weight of the total composition.

The aluminosilicate is typically amorphous, which may be assessed by the absence of sharp peaks in the x-ray powder diffraction spectrum of the material. The mole ratio of Si:Al in the composition is typically from 3 to 30, preferably from 4 to 15 and more preferably from 5 to 10. In this context, the reference to mole ratio of Si:Al is based on the amount of silicon (in moles) in the silicate and aluminium (in moles) in the aluminate used for preparation of the compositions. The aluminosilicate is usually formed by the sol-gel route, preferably in situ from admixture of precursor components at the point of use.

The compositions preferably also comprise a metal or metal oxide to aid preservation of the film forming properties of the composition, especially film integrity, upon storage. The metal or oxide will usually be in particulate form and be sparingly soluble in water. Suitable the volume median particle diameter of the metal or metal oxide will be 50 μm or less. Preferably, less than 1% by volume of the metal or metal oxide particles will exceed 200 μm. Amphoteric or acidic oxides are typically employed for this purpose.

The metal oxide may, for example, be selected from zinc oxide, silicon oxide, aluminium oxide, boron oxide, tin oxide, gallium oxide, germanium oxide and mixtures of two or more of these oxides. Instead of introducing the metal in the form of an oxide, the oxide may alternatively be formed in situ as a result of adding the metal per se to the composition. Without wishing to be bound by theory, it is believed that the zinc or other oxide reacts with any residual silicate to reduce solubility of films formed by coating or otherwise applying the composition to foamed polymer.

Preferably also, the amount of the metal oxide or metal is up to 10%, preferably from 0.3% to 5% by weight (e.g. from 0.3% to 3% by weight) of the total composition.

The compositions preferably comprise from 0% to 10%, preferably from 0.3% to 5% (e.g. 0.3% to 4%) by weight of the organic liquid.

Preferably, it has a boiling point (at atmospheric pressure) of at least 110° C., typically at least 130° C. and typically up to 500° C.

The organic liquid is desirably one which is stable under alkaline conditions and also stable with respect to oxidation, heat and light.

The organic liquid is typically one having a viscosity of less than 5000 mPa·s, preferably less than 2000 mPa·s (e.g. less than 1000 mPa·s), at a temperature of 25° C., measured at a shear rate of 23 sec$^{-1}$.

The organic liquid may comprise one or more substantially water immiscible organic solvents selected from polyhydroxy alcohols, mineral oils, liquid paraffin oils, glycol ethers, silicone oils and mixtures thereof. Of these, silicone oils are especially preferred.

Suitable silicone oils for use in the compositions and precursor systems therefor, are organosiloxanes, typically having the general formula (I):

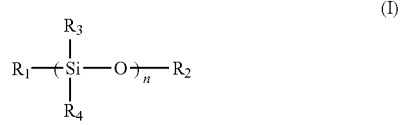

(I)

wherein n is the number of repeating units in the polymer and can range from 2, e.g. from 10, up to 1,000,000, more preferably from 30, e.g. from 50, up to 500,000 and $R_1$ can be selected from hydrogen or methyl groups and $R_2$ can be selected from hydrogen or $SiR_5$ in which $R_5$ can be either hydrogen, hydroxyl or methyl and wherein $R_3$ and $R_4$ can be independently selected from $C_1$ to $C_{12}$ straight chain or branched, saturated or unsaturated alkyl, alkenyl or phenyl moieties or from units according to formula (I) above or from substituted alkyl or substituted phenyl moieties in which substituents can be halogens, amino groups, sulphate groups, sulphonate groups, carboxy groups, hydroxy groups or nitro groups.

The compositions (which may optionally be prepared from a precursor system at the point of use) may for example be applied to the foamed polymer by means of a spray gun (optionally air or gas pressurised), a roller system or a brush system. Alternatively the foamed polymer to be treated may be coated or impregnated by immersion in the coating composition while contained in a suitable vessel, for example in a fluid bed, an agitated bed or in a mixer like a ribbon blender.

The compositions which are to be used as fire retardants are especially suited to those which comprise an expanded or foamed polymer. Most preferably, that polymer is one which is substantially insoluble in the organic liquid, if present, at room temperature, i.e. the liquid component is selected with that requirement in mind.

Preferably, the moisture content of the resultant cured or dried composition film, i.e. the coating, is no greater than 40%, more preferably no greater than 35% and still more preferably no greater than 20% by weight, most preferably 17% by weight or less.

The properties of the film resulting from the compositions of the invention may be improved by holding the composition at a temperature of 50° C. or more while the composition is has a moisture content greater than 20% by weight, for at least 30 minutes.

In addition, the properties of the film, such as hydrophobicity or lubricity, may be enhanced by applying onto the film a low melting point wax, such as for example micronized polyethylene wax (a low molecular weight polyethylene polymer that is oxidized or non-oxidized and because of its low molecular weight has wax like physical characteristics) or a stearate, such as glycol stearate (for example glycol tristearate) or a metal stearate (for example Zn, Ca, Na, Mg stearate) or a combination of one or more waxes and one or more stearates. The wax, stearate or mixture thereof should preferable have a melting point from 60° C. to 150° C., more preferably from 80° C. to 135° C., and most preferably from 90° C. to 130° C. For example Zinc Stearate, with a melting point of 120-130° C. can be applied onto the film to serve as a lubrication agent to facilitate further processing of the coated film when applied to a polymeric material.

Preferred coatings have a long term solubility of no greater than 25%, typically no greater than 20%, preferably no greater than 15%, and more preferably no greater than 10%, as determined by the water resistance/solubility methodology defined hereinafter, after oven drying the film at 80° C. to a water content of about 17% and then soaking in water at a temperature of about 22° C. for 7 days.

The present invention will now be explained in more detail by way of the following non-limiting Examples.

EXAMPLE 1

Preparation of Aluminosilicate Sol-Gel with a Molar Ratio of Si/Al of 8.5 (Comparative)

50 grams of sodium silicate solution (8.6% $Na_2O$, 29% $SiO_2$, balance water) was weighed directly into a plastic beaker. The silicate solution was vigorously stirred. To the vigorously stirred silicate solution, 40 grams of sodium aluminate solution (2.6% $Na_2O$, 3.6% $Al_2O_3$) was added dropwise over 3 to 4 minutes. After a further 10-20 seconds of mixing, stirring was stopped.

Approximately 25 grams of the resultant clear aluminosilicate sol formed was accurately weighed and poured onto a preweighed flat circular (~10 centimeter in diameter) plastic dish. The aluminosilicate sol was allowed to set for about 5 minutes to form a gel network. All of the foregoing steps were carried out under room temperature conditions (about 22° C.). The coated dish was placed in an oven at 80° C. for 24 hours and the plastic and the dried contents were then weighed. The dried aluminosilicate formed was a continuous and strong circular shaped sheet with about 1 mm thickness and its solid content was 74% by weight (i.e. water content of 26% by weight).

EXAMPLE 2

Comparative

The experiment of Example 1 was repeated but this time no aluminate solution was added and instead of the aluminate solution 37.5 grams of pure water was added. The resulting film (silicate only) was dried to a final moisture content of 26% by weight.

Water Resistance/Solubility Methodology

In order to test water resistance/solubility, the following procedure is adopted:

The dried film is first broken into large (about 2 cm across) pieces. 2.0 g of the pieces are put in a sterelin jar and 28 g of water added. The pieces are fully submerged in the water and left to stand for 24 hours at ambient temperature (about 22° C.). The contents of the solution are analysed (using titration and gravimetric methods) and the solubility of the pieces after 24 hours soaking, is determined using the following formula:

$$\frac{\text{Dissolved contents in the solution} \times 100}{2.0}$$

When this procedure was applied to the film obtained in Example 1 and also to the film as obtained in Example 2, the following solubility results were obtained.

| | % Solubility |
|---|---|
| Example 1 | 5 |
| Example 2 | 100 |

These results clearly indicate that the formation of aluminosilicate films via the sol-gel process not only result in initially strong, solid films but also significantly enhances the water resistant property of the films produced.

The above results relate to a film which has been dried to a water content of 26% by weight. Elsewhere in this specification, the same methodology is employed except that the extent of drying and soaking may be varied as specified.

EXAMPLE 3

Effect of Organic Liquid

The film formed in Example 1 was strong and clear. However, when such film was oven dried beyond 24 hours, it gradually started to form white patches and within 72 hours, it had turned to a weak and white flaky/powdery material.

To enhance the integrity of the aluminosilicate film beyond 24 hours drying, a small amount of organic liquid was added to the silicate solution of Example 1. Addition of 0.5 g of silicone oil with a viscosity of 50 mPa·s, for example, maintained the integrity of the aluminosilicate film even after 168 hours of oven drying at 80° C. A number of organic liquids having various boiling points (BP) were tested (each added at a level of 0.5 g, corresponding to 0.55% by weight of the composition) and their impact on the integrity of aluminosilicate film after prolonged drying (168 hours of oven drying at 80° C.) are given below:

| Organic Liquid tested | BP(° C.) | Film Integrity |
|---|---|---|
| Hexamethyl Silazane | 110 | Powdery, white |
| Hexamethyl Disiloxane (0.65 mPa·s)) | 100 | Powdery, white |
| Silicone Oil (10 mPa·s) | >150 | Clear, non-powdery |
| Silicone Oil (20 mPa·s) | >150 | Clear, non-powdery |
| Silicone Oil (50 mPa·s) | >150 | Clear, non-powdery |
| Silicone Oil (200 mPa·s) | >150 | Clear, non-powdery |
| Silicone Oil (1000 mPa·s) | >150 | Clear, non-powdery |
| Liquid Paraffin Oil | ~300 | Clear, non-powdery |

EXAMPLE 4

Effect of Film Moisture Content on Water Resistance

The dried film made according to Example 1 had a moisture content of 26%. When this film was soaked for 24 hours, it remained fairly intact. However, when the soaking in water was extended to 3 and then to 7 days, the solubility of the film increased proportionally. Reducing the moisture content of the film by for example prolonging drying time, would have minimised its water solubility. However, this is not an option for a film produced according to Example 1 as prolonged drying to minimise its moisture content, will result in weak and powdery film. However, the film made according to Example 3 (i.e. containing silicone oil) has no such problem, and thus the silicone oil containing film of Example 3 using the 50 mPa·s silicone oil was dried to longer times to generate films with different moisture contents. The effect of film moisture content on the solubility of such film was conducted and the results are given below:

| | Solubility Results | | |
|---|---|---|---|
| | Days Soaked in Water | | |
| % Moisture Content of Film | 1 | 3 | 7 |
| 26 | 5% | 20% | 47% |
| 22 | 4% | 15% | 30% |
| 17 | 3% | 4% | 5% |

The above table clearly indicate that an aluminosilicate film containing a water immiscible liquid such as silicone oil and having a moisture content of about 17% is significantly more resistant to water.

EXAMPLE 5

Long Term Water Resistance

The aluminosilicate film (with moisture content of 17%) made according to Example 4 and soaked for 7 days has good water resistance. However, when the same film is soaked for more than 7 days, for example 10 and 25 days, its water resistance decreases with increased soaking time.

To further improve the long-term water resistance of the aluminosilicate film, Example 4 was repeated but 1 gram of zinc oxide was added to and thereby suspended in the silicate and silicone oil mixture. The solubility of films made according to Examples 4 and 5 (with moisture contents of 17%) were assessed using the methodology defined hereinbefore using soaking times of 7, 10 and 25 days. The following results were obtained:

| Solubility after Soaking for 7, 10 and 25 Days | | | |
|---|---|---|---|
| Sample | 7 days | 10 days | 25 days |
| Example 4 (without Zinc Oxide) | 3% | 10% | 30% |
| Example 5 (with Zinc Oxide) | 1% | 1.3% | 4% |

As can be seen from the above results, addition of a small amount of zinc oxide enhances the long-term water resistance of films produced using aqueous aluminosilicate compositions obtained by the sol-gel route.

EXAMPLE 6

Production of Aluminosilicate Sol-Gel Film (Si/Al Ratio of 8.5) Using an In-Line Mixer To stirred 1335 grams of sodium silicate solution (17.1% $Na_2O$, 23.9% $SiO_2$, balance water), 11 grams of silicone oil (viscosity 20 mPa·s at 25° C.) was added. The silicone oil silicate mixture and sodium aluminate solution (4.6% $Na_2O$, 5.6% $Al_2O_3$) were simultaneously pumped to a high shear in-line mixer (with inlet ports adapted to suit the viscosity of the resultant sol) at the rate of 253 ml/minute and 107 ml/minute respectively. A clear aluminosilicate sol was formed and a sample of this sol was treated and characterised in the same way as in Example 1.

EXAMPLE 7

The same as Example 6 but with 22 grams of zinc oxide added to the silicate/silicone mixture.

The results of solubility tests for samples of Examples 6 and 7 dried to moisture content of 17% and soaked in water for 7, 10 and 14 days were as follows:

| Solubility after Soaking for 7, 10 and 14 Days | | | |
|---|---|---|---|
| Sample | 7 days | 10 days | 14 days |
| Example 6 (without Zinc Oxide) | 2.7% | 9.5% | 13% |
| Example 7 (with Zinc Oxide) | 1% | 1.2% | 2.2% |

EXAMPLE 8

Coating of Beads in a Fluidized Bed Followed by Shape Moulding

Prime regular EPS beads with a size of 1.0-1.6 mm were preexpanded using a batch preexpander to a density of 20 kg/m3, with a preexpansion pressure of 0.25 bar. After preexpansion a bead size of the EPS of 3-4 mm is obtained and this is used for coating with the mixture according to Example 7. These beads are placed in a fluidized bed, where the airflow can be set to lift the beads. The airflow is low to begin with and increases proportionally as the coating is applied, so as to continue to levitate the beads of which the density increases when more mixture is sprayed onto the beads.

Beads coated with the mixture are stored in an intermediate silo and thereafter transferred to a closed mould of 1×1×0.1 m. This mould has core vents at regular distances through which the steam can be applied to the mixture of loose beads coated with the mixture.

The mixture becomes slightly viscous by heating with the steam, provided that the DS (dry solid) content lies in between 75 to 85% and the expansion of the EPS beads ensures that the open spaces between the individual beads are filled as a result of the further expansion.

On making a cross section a honeycomblike structure is obtained where the mixture has deformed and forms a continuous network. The EPS beads are merely a carrier for the mixture.

Sheets were produced with densities of 80 and 150 kg/m³. The sheets were tested in water of 20° C. during 2 weeks and it maintained their structural integrity. The weight loss, measured after drying of the sheet, was <5%. To the surprise of the inventors when tested according to DIN 4102 B2 these sample passed this test, which is normally only possible with flame retardant EPS.

EXAMPLE 9

Coating of 50% Recycled EPS, 50% Pre-Expanded EPS in a Fluidized Bed Followed by Shape Moulding In another embodiment of the invention the mixture according to Example 7 was sprayed onto a mixture of pre-expanded EPS and packaging waste ground to a size of 4-5 mm Recycled-EPS or REPS in a ratio of 50/50 EPS/REPS. This mixture was placed in a fluidized bed, where the airflow can be set to lift the beads. The airflow is low to begin with and increases proportionally as the coating is applied, so as to continue to levitate the beads of which the density increases when more mixture is sprayed onto the 50/50 mixture.

Beads coated with the mixture are stored in an intermediate silo and thereafter transferred to a closed mould of 1×1×0.1 m. This mould has core vents at regular distances through which the steam can be applied to the 50/50 ERPS/REPS coated with the mixture.

The properties of the product thus obtained are equal to the results of Example 8.

EXAMPLE 10

Coating of Arcel EPS in a Fluidized Bed Followed by Shape Moulding

In another embodiment of the invention the mixture according to Example 7 was sprayed onto Arcel beads (trademark of Nova Chemical, a polymeric mixture of PS and PE).

Arcel beads fluidized bed coated with the mixture are stored in an intermediate silo and thereafter transferred to a closed mould of 1×1×0.1 m.

The properties of the product thus obtained are equal to the results of Example 8.

EXAMPLE 11

Coating of EPP Foam Beads in a Fluidized Bed Followed by Shape Moulding

In another embodiment of the invention the mixture according to Example 7 was sprayed onto EPP beads. EPP beads are polymeric foam polypropylene are e.g. traded under the name Neopolene by BASF. EPP beads were used in a density of 40 g/m³ and a size of 5-7 mm. This mixture was placed in a fluidized bed, where the airflow can be set to lift the beads.

EPP beads coated with the mixture according to Example 7 are stored in an intermediate silo and thereafter transferred to a closed mould of 1×1×0.1 m.

The properties of the product thus obtained are equal to the results of Example 8.

The invention claimed is:

1. A composite comprising a foamed polymer having a coating thereon with fire retardant properties, wherein the coating is produced of an aqueous gel-forming composition, comprising an aluminosilicate composition, an organic liquid comprising at least one substantially water immiscible organic solvent, and one or more optional other ingredients,
   wherein the at least one substantially water immiscible organic solvent is selected from mineral oils, liquid paraffin oils, silicone oils, and mixtures thereof;
   wherein the aluminosilicate composition is from 45% to 90% by weight, on a basis of the dried coating; and
   wherein the dried coating has a moisture content of 16% by weight, or less.

2. The composite according to claim 1, in which the aluminosilicate composition is from 50% to 85%, by weight, on a basis of the dried coating.

3. The composite as claimed in claim 1 in which the coating further comprises at least one metal or metal oxide in an amount of up to 16% by weight of the dried coating.

4. The composite as claimed in claim 1 in which the organic liquid comprises up to 16% by weight of the dried coating.

5. The composite as claimed in claim 1 in which the aluminosilicate has a Si:Al mole ratio of from 3 to 30.

6. A construction material comprising the composite according to claim 1.

7. The construction material according to claim 6 which is in the form of a door, sheeting, ceiling or tile.

8. An insulation material comprising the composite according to claim 1.

9. A construction material for packaging comprising the composite according to claim 1.

* * * * *